(12) United States Patent
Turner (10) Patent No.: US 6,990,100 B2
(45) Date of Patent: Jan. 24, 2006

(54) PACKET CONVERSION

(75) Inventor: Douglas John Turner, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 797 days.

(21) Appl. No.: 09/809,726

(22) Filed: Mar. 15, 2001

(65) Prior Publication Data

US 2001/0030976 A1 Oct. 18, 2001

(30) Foreign Application Priority Data

Mar. 17, 2000 (GB) .................................. 0006575

(51) Int. Cl.
    *H04L 12/28* (2006.01)
(52) U.S. Cl. ...................... 370/392; 370/465; 370/474; 370/476
(58) Field of Classification Search ................ 370/392, 370/401, 465, 466, 467, 474, 476
See application file for complete search history.

(56) References Cited

U.S. PATENT DOCUMENTS

| | | | |
|---|---|---|---|
| 5,594,927 A * | 1/1997 | Lee et al. | 710/66 |
| 6,088,777 A * | 7/2000 | Sorber | 711/171 |
| 6,415,345 B1 * | 7/2002 | Wu et al. | 710/305 |

* cited by examiner

*Primary Examiner*—Ricky Ngo
*Assistant Examiner*—Christine Ng
(74) *Attorney, Agent, or Firm*—Lisa K. Jorgenson; James H. Morris; Wolf, Greenfield & Sacks, P.C.

(57) ABSTRACT

A method of converting a packet of data from a source format to a target format, the packet including a type indicator and at least one data field, the method including the steps of storing a table for each packet type, each table including for each data field of that packet type a value representative of a storage requirement in memory and a corresponding field descriptor denoting the nature of the data field; receiving a packet in a source format; identifying the type of packet from the type indicator; accessing the stored table for the type of packet identified and thus obtaining for each data field a value representative of a storage requirement in memory and a field descriptor for that field; and using the value and the field descriptor to load the packet into a target memory according to the target format specified by the field descriptor.

9 Claims, 5 Drawing Sheets

PACKET CONVERSION

FIELD OF THE INVENTION

The present invention relates to packet conversion and in particular to a method and system for converting packets.

DISCUSSION OF THE RELATED ART

It is known in the art that high performance Central Processing Units (CPUs) commonly require data which they are accessing to be held in memory in a certain alignment structure. This means that they are only able to access native multibyte data if it is held in memory at addresses which have an alignment consistent with the size of the data. For example, a given CPU will only be able to access 4 byte words if they are held in memory starting on 4 byte boundaries. If the data is not held in the correct format, when the CPU attempts to access the data, an exception is caused.

Such data can be for example, code for execution by a computer such as an instruction sequence. One particular example is a standard 32-bit processor accessing 4 byte instructions, or code which contains at least some instructions of 4 bytes in length. It will be appreciated that the word data used herein defines any bit sequences, including instructions and/or operands. Such data can only be accessed if it is stored on 4 byte boundaries. Therefore, if a data structure is mixed, that is it contains words of 4 bytes and shorter lengths, the shorter words are "padded out" with spaces of unused memory in order to ensure that the following word begins on a 4 byte boundary. Commonly, such data will have originated from a C-language compiler, which automatically inserts the appropriate spaces of unused memory in anticipation of the data being accessed by a CPU.

It is thus apparent that the inserted spaces constitute a wastage of memory space. In addition, a problem is created if the data is to be accessed by a CPU of a host computer and transmitted in packets to a different, receiving machine, since the spaces of unused memory take up valuable bandwidth. To avoid this, the host computer removes these spaces when segmenting the data into packets, so that packets are transmitted without any unused memory spaces which were present in memory merely for alignment purposes, and the receiving machine re-pads the data so that its CPU is able to read it.

Another problem with transmitting and receiving data is the endianess of the data. This term refers to whether a machine reads and stores data in the format most significant byte (MSB) first or in the format least significant byte (LSB) first. Most machines require data to be received and stored in either one or other of these two formats. Therefore, when transferring data between two machines, the machine transmitting the data needs to use a transfer protocol which stipulates the endianess of the data. If the receiving machine uses the other format, one of the machines will need to convert the data into the format suitable for use by the receiving machine.

One known solution to both of the above requirements is to have a code on the CPU of each machine for each type of packet. Typical code extracts for transmission and receiving of data can be found in Appendix A. The code is packet-specific and works by considering each word and processing it according to certain conditions. For example, the parameters "receive_word( )" and "emit_word_value( )" are used to deal with misaligned memory references and endianess in order to avoid causing an exception. This type of code provides a cumbersome, inelegant solution because it is difficult to follow, difficult to de-bug and difficult to maintain, for example when modifications are required because packet formats have changed. Furthermore, both machines would need to have their own code for dealing with each type of packet, and storage and use of such codes is memory- and time-inefficient.

An alternative solution is to provide a processor which can access multibyte values which are aligned on any boundary, such as the Pentium chip. This requires multiple bus access, which would be inefficient, Therefore there is a need to provide a more efficient and simpler solution to the requirements of transmitting and receiving packetised data, such that the problems of dealing efficiently with unused memory spaces and endianess are mitigated.

SUMMARY OF THE INVENTION

According to the present invention there is provided a method of converting a packet of data from a source format to a target format, the packet comprising a type indicator and at least one data field, the method comprising the steps of: storing a table for each packet type, each table comprising for each data field of that packet type a value representative of a storage requirement in memory and a corresponding field descriptor denoting the nature of the data field; receiving a packet in a source format; identifying the type of packet from the type indicator; accessing the stored table for the type of packet identified and thus obtaining for each data field a value representative of a storage requirement in memory and a field descriptor for that field; and using the value and the field descriptor to load the packet into a target memory according to the target format specified by the field descriptor.

BRIEF DESCRIPTION OF THE DRAWINGS

The invention will now be described, by way of example only, with reference to the accompanying drawings in which.

DESCRIPTION OF THE PREFERRED EMBODIMENTS

In the figures, like reference numerals indicate like parts.

The situation in which a preferred embodiment of the present invention operates is when a first, transmitting machine needs to transmit data which it must access from a memory where it has been stored by a C-language compiler. In this case, the data is in the form of packets, each containing a number of words, some of which words are of four bytes in length. Each packet can be one of a number of different types, but none of them contains any words longer than 4 bytes, although it is likely that they will contain some words of a shorter length. They may also contain nested words. Furthermore, the C-language compiler will have arranged the words such that no words are stored over a four-byte boundary, by leaving unused spaces in memory after words which are shorter than 4 bytes, such that the following word begins on a four-byte boundary. In other words, the data that the transmitting machine accesses has been aligned by the C-language compiler. The words and unused spaces are collectively known as the fields of the packet.

The transmitting machine needs to transmit this data to a second, receiving machine. Before doing this, the transmitting machine must convert the data into a form suitable for transmission, by removing the unused spaces. It is also necessary for both transmitting and receiving machines to be aware of the endianess of the data and to have the facility to convert the data in this respect, should this be necessary. In practice, it would be sensible for the machine having the more powerful CPU to perform any endianess conversion required. In this particular embodiment, the transmitting machine requires an MSB format and transmits the data as such, and the receiving machine requires an LSB format and must therefore convert it as such.

When the data is received by the receiving machine, it is necessary for the data to be converted back to the form in which it was stored by the C-language compiler, so that the CPU of the receiving machine can read it.

This embodiment of the invention is concerned with the necessary data conversions, and providing an improvement over the prior art therefor.

One type of packet which is being transmitted and received in the situations described above is shown in FIG. 1, indicated generally by reference numeral 1. This packet has a total length of sixteen bytes, BYTE 0 . . . BYTE 15, as indicated diagrammatically.

Figure 1:
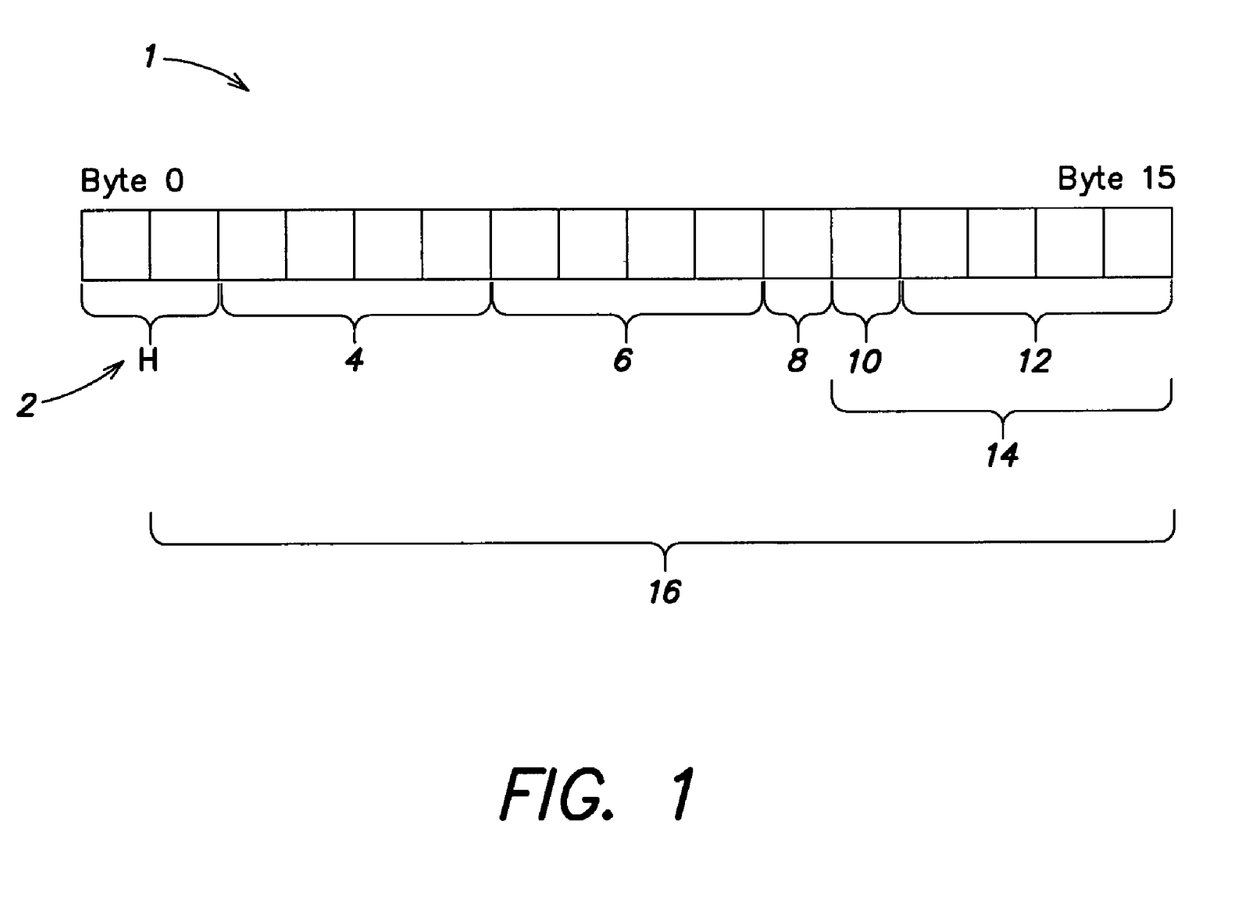
FIG. 1 shows a packet of data ready for transmission.

The first two bytes, BYTE 0, BYTE 1, are a packet header 2, shown bracketed labeled as H. These header bytes comprise various information, including a packet type indicator and information indicating the nature of the data contained in the remainder of the packet, such as whether it is integer or text data. This information could be included within the packet at any suitable location, not necessarily in the header. This information could contain an endianess indicator for the packet, although this would increase the bandwidth required to transmit the packet. In this embodiment, an endianess indicator is not required, since the receiving machine is aware that the packets which it is receiving are of MSB format, as described above.

The other fourteen bytes, BYTE 2 . . . BYTE 15, are the actual data, shown by bracket 16. Of these fourteen bytes, the first four are an integer word of four bytes length, as shown by bracket 4. The second four bytes are a text word of four bytes length, as shown by bracket 6. The next byte is an integer word of one byte in length, as shown by bracket 8. The remaining five bytes are a nested data structure, as shown by bracket 14. Within this nested data structure 14, the first byte is an integer word of one byte in length, as shown by bracket 10, and the remaining four bytes are an integer word of four bytes in length, as shown by bracket 12.

Thus in written form, the packet looks as follows:

```
{
    4-byte integer word
    4-byte text word
    1-byte integer word
    {
        1-byte integer word
        4-byte integer word
    }
}
```

Figure 4:
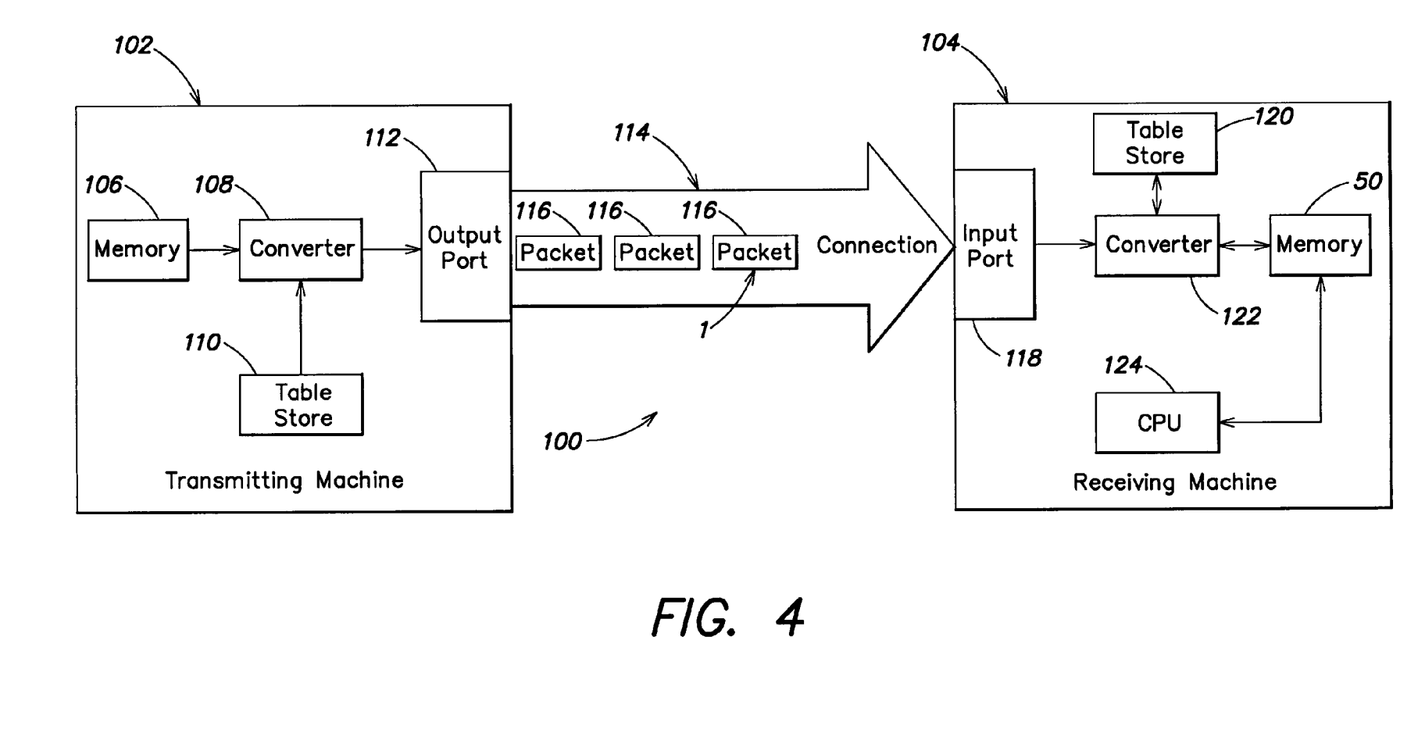
FIG. 4 is a diagrammatic representation of equipment on which the invention can be implemented.

Referring next to FIG. 4, there is shown a system comprising a transmitting machine 102 and a receiving machine 104. There is also shown a connection 114 between the transmitting machine 102 and the receiving machine 104, along which data is being transmitted from the transmitting machine 102 to the receiving machine 104. This data is in the form of packets 116, some of which will be packets of the type of packet 1 shown in FIG. 1.

Within transmitting machine 102 there is a memory 106, from which data is received by a converter 108. The converter also receives information from a table store 110. Table store 110 stores a number of tables for use in data conversion, one for each known type of packet, as will be described in detail below. Having converted the data (as described below), the converter 108 sends it to an output port 112 from which it is transmitted along the connection 114.

The receiving machine 104 has an input port 118 which receives transmitted data from the connection 114 and sends it to a converter 122. The converter 122 is provided with a two-way connection with each of a table store 120 and a memory 50.

Table store 120 stores a number of tables for use in data conversion, one for each known type of packet, as will be described in detail below. The memory 50 is also provided with a two-way connection with a CPU 124. Thus it is apparent that the conversion to be performed on the data by converter 122 is carried out independently from the CPU 124.

In operation, memory 106 has data stored in a form suitable for use by receiving machine 102, that is in a form which includes unused spaces of memory. Since this data needs to be transmitted in the form of packets without these unused spaces, it is passed from the memory 106 to converter 108. One of the memory 106 and the converter 108 will be provided with information allowing the data to be segmented into packets and a header added to it. Converter 108 identifies the type of packet from information given in the header, which enables it to access in table store 110 a table corresponding to the type of packet identified. The way in which the converter converts the data using the table will be described in more detail below, but one operation which it performs is to remove any unused spaces within the data which have been retrieved from memory 106. This converted data is then transmitted in packetised form along connection 114 via output port 112.

Upon arrival at receiving machine 104, the data enters converter 122 via input port 118. Converter 122 identifies the type of packet from its header, and uses this information to access in table store 110 a table corresponding to the type of packet identified. The way in which the converter converts the data using the table will be described in more detail below, but one operation which it performs is to allow the packet to be stored in memory 50 with any unused spaces of memory which are required by CPU 124 for alignment purposes. It also deals with any endianess conversions required on the data. After the data has been stored in memory 50, it can be accessed by the CPU 124.

Figure 5:
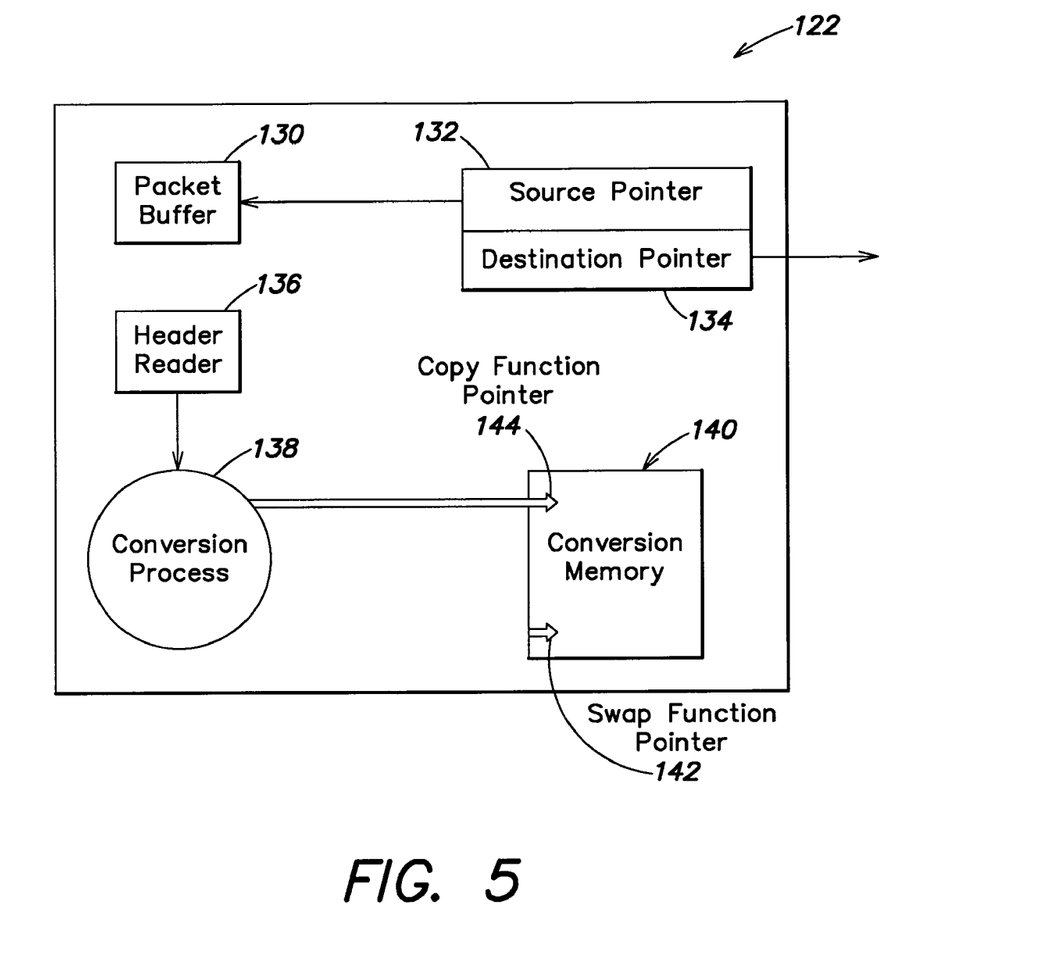
FIG. 5 is a diagrammatic representation of a converter used in association with storage in memory of the packet of FIG. 1.

FIG. 5 is a more detailed diagrammatic representation of converter 122. There is shown a packet buffer 130, which is pointed to by a source pointer 132. A destination pointer 134 is also shown, which points to areas of memory 50 (see FIG. 4). The pointers 132, 134 could be implemented in respective registers. There is also provided a header reader 136 capable of supplying information to a conversion process 138. The conversion process 138 has associated with it a conversion memory 140, which holds a swap function routine pointed to by a swap function pointer 142 and a copy function routine pointed to by a copy function pointer 144.

In operation, the packets from input port 118 of receiving machine 104 (see FIG. 4) are received into packet buffer 130. Source pointer 132 identifies the first word of a packet to be stored and destination pointer 134 points to an area within memory 50 in which this word is to be stored. A data conversion is carried out on each word before it is stored in memory 50, and after each storage, the two pointers 132, 134 will move accordingly to the next position in the packet or memory 50 accordingly. The exact way in which these movements are dictated will be described in detail below with reference to FIG. 3.

In order to allow the correct conversion of data within each packet, the header reader 136 reads the packet header to identify the type of packet. For example, it may identify a packet of the type 1 shown in FIG. 1. In this case the endianess of the packets will be MSB format. This information is passed to the conversion process 138. The conversion process identifies the receiving machine as LSB and so points to the swap function routine in the conversion memory 140. If the receiving machine was MSB, i.e. the same as the transmitter, the pointer 144 would be used to point to the copy function machine. If the swap function routine is set, it is important to note that not all data is swapped, as described later. That is, byte oriented data (e.g. ASCII text) is copied while native multibyte data types (e.g. integer values) are byte swapped, according to the field descriptor.

For the moment, we will assume that the transmitting machine has successfully converted the data and transmitted it without the memory spaces added by the C-language compiler, therefore the following will describe how the receiving machine deals with the incoming data. Further explanation of the transmission process will be given subsequently.

The CPU of the receiving machine is not interested in the format in which the data is received, providing it can access the data in a format suitable for it. Therefore, the conversion of the data from the received format to the CPU-accessible format can be done by the receiving machine independently from the CPU.

In order to facilitate efficient conversion of the received data, the receiving machine has stored a number of data tables, one for each known type of packet. Creation of these tables will be discussed below.

Figure 2:
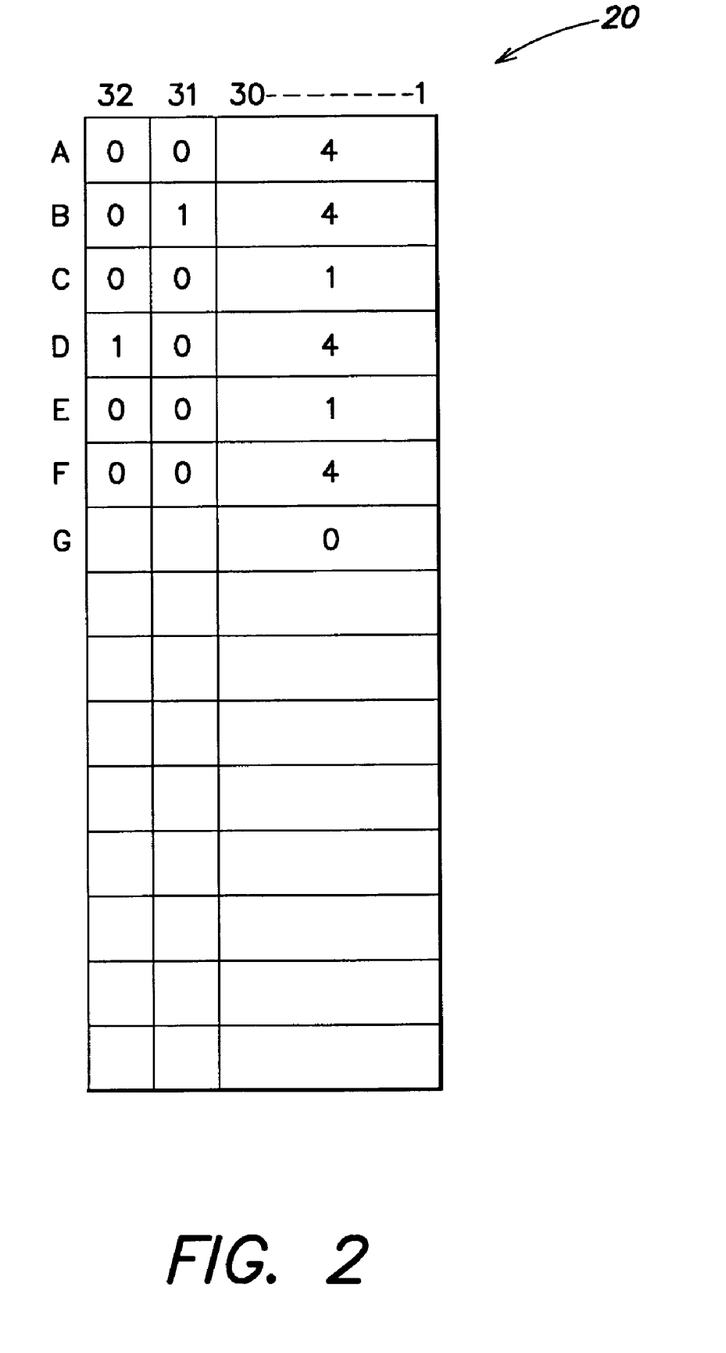
FIG. 2 shows a table corresponding to the packet of FIG. 1.

FIG. 2 shows a table for use in converting the packet of FIG. 1, indicated generally by reference numeral 20.

In order to allow for automatic conversion of the data, the machine needs to know what type of packet it has received. Therefore the first stage in the process is to read the packet header to obtain this information. In the case of reception of packet 1, the header will inform the header reader 136 of receiving machine 104 that the packet is of the type of packet 1. If the receiving machine used the same endianess as the transmitting machine, it would set up a function pointer to point to a simple byte copy routine. In this case, since the receiving machine uses LSB format, which is different from the data it receives from the transmitting machine, it sets up function pointers 142, 144 to allow either an endianess-swapping copy routine or a straight copy routine, as discussed above with reference to FIG. 5.

Having obtained the information from the header and set up the function pointer, the receiving machine looks up the table of FIG. 2. This table is 32 bits across (indicated by columns—not all individually shown—of the table in FIG. 2), with a row of 0x00000000 (Row G in the example) indicating the end of the table.

In FIG. 2, the top two bits, bits 31 and 30 are used as a field descriptor. Each field, represented by a corresponding row of the table, has its own field descriptor. This field descriptor can have three possible values, the value denoting one of three types of field. The field can be either a word which may require byte swapping, or a word which should not be byte swapped, or a specific alignment requirement. A specific alignment requirement is required when the actual alignment required for the subsequent field is not the same as would be expected given the size and type of the field.

The remaining 30 bits of each row, bits 0–29, indicate one of three possibilities, which correspond to the three possible values of the field descriptor. If the field is a native multibyte value, bits 0–29 indicate the length of the field as well as inferring a required alignment. If the field is byte oriented data (e.g. ASCII text), bits 0–29 merely indicate the length of the field, but do not infer an alignment. The third possibility is for bits 0–29 to merely indicate an alignment requirement; in this case, the actual alignment required for the field is not the same as would be expected for the size of the field represented by the subsequent row if there were no alignment requirements. In other words, this type of alignment requirement is used to ensure that the next word is correctly aligned.

The possible values of the field descriptors, bits 31 and 30, and the meaning of the remaining bits, bits 0–29 can be summarised by consulting the following table:

| Bit 31 | Bit 30 | Meaning |
|---|---|---|
| 0 | 0 | Normal data field, subject to byte swapping when packing/unpacking. Bits 0–29 indicate the length of the field and provide the implicit alignment required for the field. |
| 0 | 1 | Normal data field, however its contents should not be byte swapped when packing/unpacking. Bits 0–29 indicate the length of the field but do not infer a required alignment for the field. |
| 1 | 0 | This specifies an alignment requirement. No data is copied for entries of this type, however the associated data pointer is adjusted forward to comply with the alignment specified in bits 0–29. |
| 1 | 1 | Not supported. |

The specific values in the table of FIG. 2 will now be explained with reference to the data packet of FIG. 1. The rows of the table are labeled alphabetically for convenience of explanation.

Row A is for the 4-byte integer word 4. Therefore, within bits 0–29 there is an indication that 4 bytes of memory space will be required for this word, and that it should be aligned on an address boundary suitable for a 4 byte data type on the CPU 124, as would be expected from its length. The field descriptor has a value 0 0, because word 4 is an integer, which means that it may require an endianess swap.

In this particular example, it does require an endianess swap, since the receiving machine operates in LSB but it has received the packet as MSB.

Row B is for the 4-byte text word 6. Therefore, within bits 0–29 there is an indication that 4 bytes of memory space will be required for this word but there is no inferred alignment requirement. The field descriptor has a value 0 1, because word 6 is a text word, which means that it should not be endian swapped, even if the transmitting and receiving machines use different endianess.

Row C is for the 1-byte integer word 8. Therefore, within bits 0–29 there is an indication that 1 byte of memory space will be required for this word, as well as an inferred indication that it is expected from its length to be aligned on a 1 byte boundary. The field descriptor has a value 0 0, because word 8 is an integer, which means that it may require an endianess swap. However, since this word is only 1 byte long, it does not have an endianess, and could therefore equally have a field descriptor of value 0 1.

Row D specifies an alignment requirement, corresponding to 3 bytes of unused memory space to be inserted after 1-byte word 8. It is necessary to insert these 3 bytes so that the next word, nested structure 14, begins on a 4-byte boundary. Since nested structure 14 begins with a word of only 1 byte in length, 1 byte word 10, this structure would not be expected to require alignment on a 4 byte boundary. Therefore a specific alignment is required. Hence, the field descriptor has a value 1 0, indicating that the value within bits 0–29 does not indicate the number of bytes of data to be copied, but rather, tells a pointer to skip to the next 4-byte boundary, as will be described below with reference to FIG. 3.

Rows E and F are for 1-byte integer word 10 and 4-byte integer word 12 of the nested structure 14 respectively. Therefore, within bits 0–29 there is an indication that 1 byte and 4 bytes of memory respectively are required for this nested structure. The field descriptor in both rows E and F has a value 0 0, as for the other integer words, indicating a field length and inferring an alignment requirement. Therefore, the value of 1 in row E infers that 1 byte word 10 is to be aligned on a 1 byte boundary as expected from its length, and the value of 4 in row F infers that 4 byte word 12 is to be aligned on a 4 byte boundary, also as expected.

Finally, the last row of the table, row G, specifies a value of 0, indicating the end of the table.

The way in which the receiving machine uses the information in the table will now be described with reference to FIG. 3.

Figure 3:
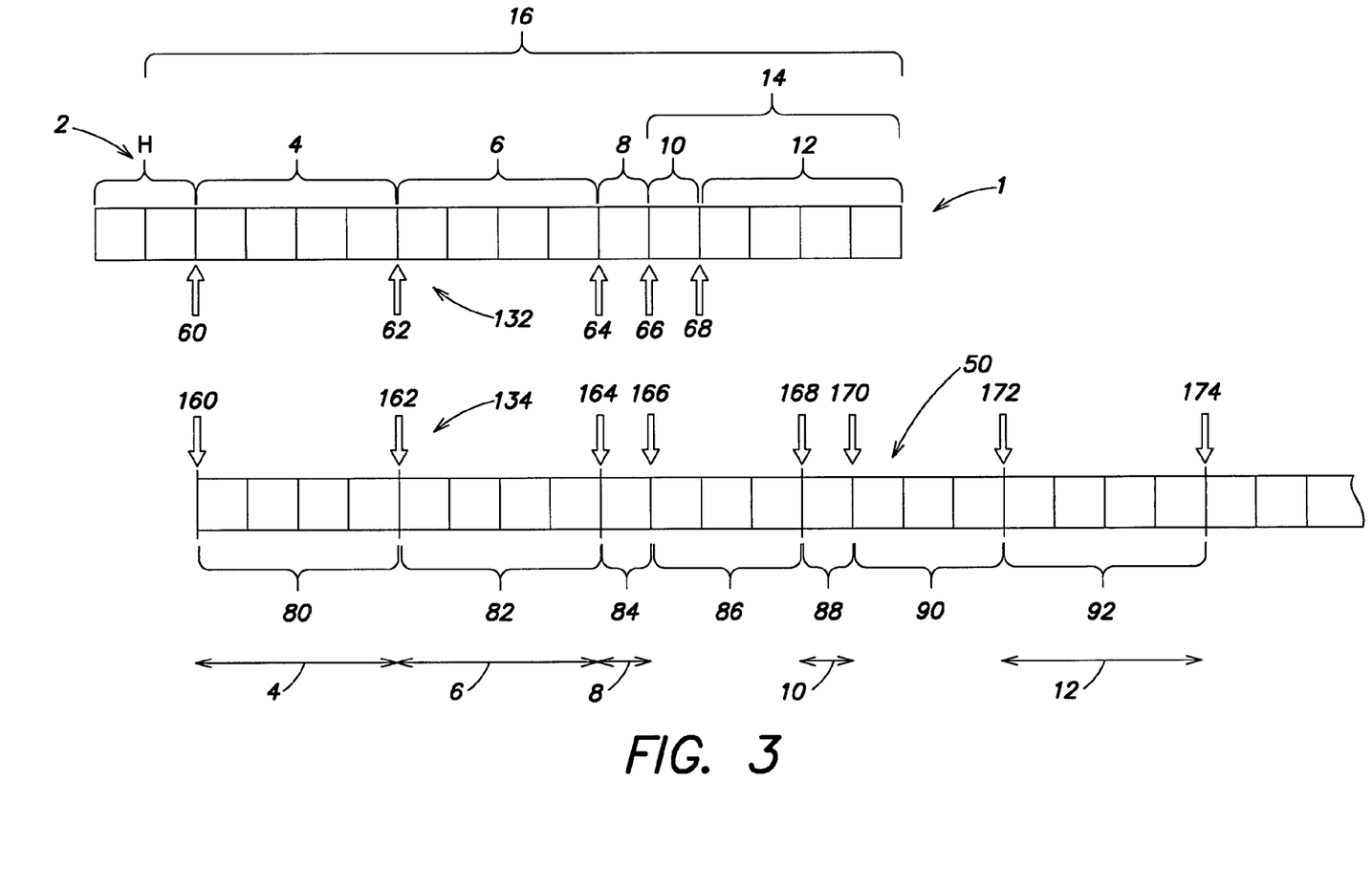
FIG. 3 shows the packet of data of FIG. 1, together with a diagrammatic indication of how it is stored in memory.

FIG. 3 shows the data packet 1 of FIG. 1. Reference numeral 50 indicates generally a diagrammatic representation of memory in the receiving machine, divided into 1 byte areas. There are also shown in various locations, the source pointer 132, pointing towards word boundaries of packet 1 and the destination pointer 134, pointing towards areas of memory 50.

Upon accessing table 20, the converter 122 of receiving machine 104 begins at row A and locates the start of the first word, 4-byte integer word 4, and moves source pointer 132 to indicate this start, shown diagrammatically at position 60. The word 4 is then processed through an endianess-swapping routine, as indicated by the swapping function pointer 142, which was set as described above in order to change its endianess, and then stored in a 4-byte area of memory 80, the start of which is indicated by destination pointer 134, shown diagrammatically at position 160.

Since the first row of table 20 has the field descriptor 0 0 and because the length is indicated as 4 bytes in bits 0–29, the source pointer 132 is then moved to position 62, the start of the next word 6. The value of 4 in table 20 implies an alignment requirement on a 4 byte boundary, therefore the destination pointer 134 is moved to position 162, the start of the next available area of memory 82, which is also on a 4 byte boundary.

The converter 122 then reads row B of table 20 and processes the next word, 4-byte text word 6. Its field descriptor 0 1 means that it is not passed through the endianess-swapping routine, but instead is copied directly via copy function pointer 144 into the next 4-byte area of memory 82, the start of which is indicated by destination pointer 134 at position 162.

The source pointer 132 is then moved to position 64, the start of the next word 8, and the destination pointer 134 is moved to position 164, the start of the next available area of memory 84.

The converter 122 next reads row C of table 20, and thus the next word, 1-byte integer word 8, is processed. Even though its field descriptor in table 20 is 0 0, it is not byte-swapped since it is only one byte in length. It is therefore directly copied and then stored in the next available area of memory 84.

The source pointer 132 is then moved to position 66, the start of nested word 14, and the destination pointer 134 is moved to position 166, at the end of memory area 84.

Upon reading row D of table 20, the field descriptor of value 1 0 tells the converter 122 that the value in bits 0–29 is an alignment requirement rather than data to be stored. Therefore, the source pointer 132 remains at position 66, whereas the destination pointer 134 moves to position 168, thus leaving three bytes of memory space 86 unused after the end of word 8, because word 8 does not finish on a 4-byte boundary. In this way, the destination pointer 134 is aligned on the next 4-byte boundary. This means that when the converter 122 reads row E of the table, the source pointer 132 is still pointing to the next word to be stored, 1-byte integer word 10 of nested word 14, but the destination pointer 134 indicates that this is to be stored in area 88 of memory 50. It does not require an endian swap since it is only one byte in length.

At this stage, source pointer 132 moves to position 68, at the start of the final word to be stored, 4-byte integer word 12 of nested word 14, and destination pointer 134 moves to position 170, at the end of memory area 88.

Finally, the converter 122 reads row F of the table and sees that word 12 has a field descriptor 0 0 and a length indicator of 4. Since these values infer an alignment requirement which would be expected given the length of the field, destination pointer 134 is moved to position 172 on the next 4 byte boundary. This leaves three bytes of unused memory space, as indicated by bracket 90. Word 12 is then processed through the endian-swapping routine and stored in the area of memory whose start is indicated by the position 172 of destination pointer 134, bracketed as 92.

Subsequently-received data packets can then be stored in memory, if desired beginning at position 174 at the end of area 92 of memory, which is on a 4-byte boundary.

It will be appreciated that the above-described method would be applicable to other data packets having different arrangements of words. Such other data packets could have a structure such that the maximum word length is four bytes, as in the packet 1, or they could have a different maximum word length. In all cases, the alignment requirement is dictated by the longest word (including within any nested words). For example, if the maximum word length were 8 bytes, the data would need to be stored on the appropriate boundaries in memory as required by the machine. This might be on 8 byte boundaries, for example as required by a 64-bit machine, or alternatively, on some 32-bit machines, it would be on 4 byte boundaries.

The equivalent data transmission process can now be explained in relation to the receiving process discussed. In the transmitting machine, the data of packet 1 will be stored in memory 106 in a similar way as it is shown to be stored in memory 50 of FIG. 3. This means it will be stored with unused memory similar to unused memory 86. In order to transmit packet 1, the converter 108 of transmitting machine 102 must process the data to produce packet 1. This processing can in fact be done using the reverse process to the receiving process. This means that source pointers will move along the stored data in a similar way to the destination pointers 134 of FIG. 3, taking account of any unused memory spaces, and destination pointers will move in a similar way to source pointers 132, in order to place the data in packet format, without any unused spaces. This means that the same table 20 can be used as is used for the receiving process. The endianess of the data could be changed if necessary, should this be desirable prior to transmission. The final stage would be to add the header 2, which would include a type identifier to enable the receiving machine to access the correct table.

The creation of the tables will now be discussed.

It is possible to write a table for each known type of packet by hand. One way to do this would be to form a high-level C-language definition of each packet structure, such as in the form of a collection of 'C' structures in a header file. The tables could then be produced from the definitions by manually inspecting each structure in turn, and thus determining the alignment or size and endianess of each field. This is not a preferred method since it is fairly time-consuming, but it is nevertheless preferable to writing the type of code shown in appendix A.

Alternatively, and preferably, the tables could be generated automatically by writing a file containing parsable grammar. This grammar is a definition of each packet protocol in a human-readable script file. The creation of suitable grammar is not a trivial process, but could be done by a person skilled in the art, and is nevertheless more efficient than producing all the tables by hand. This grammar is processed by a filter program, run as part of a build process, to produce C header files defining the packet structures and the tables for use by the transmitting and receiving machines. The filter program can be written using a known development tool, such as YACC. Again, the use of a tool such as YACC is not trivial, but could be done by a skilled person. An example of a script file, together with the C-header files and tables produced from it using YACC is shown in appendix B.

It is clear that other methods and tools could be used to produce the tables.

Thus it can be seen that the invention provides a simple solution to the processing of data to be transmitted and received in packet form, because both transmitting and receiving machines merely have to be provided with the same set of tables for known packet formats. The solution deals with unused spaces required in memory for the purposes of a CPU, as well as the endianess requirements of different data types and of different machines. There is no need for the code of Appendix A to be written and there is no interference with the operation of the CPU of either the transmitting or receiving machines.

What is claimed is:

1. A method of converting a packet of data from a source format to a target format, the packet comprising a type indicator and at least one data field, the method comprising the steps of:
    storing a table for each packet type, each table comprising for each data field of that packet type a value representative of a storage requirement in memory and a corresponding field descriptor denoting the nature of the data field;
    receiving a packet in a source format;
    identifying the type of packet from the type indicator;
    accessing the stored table for the type of packet identified and thus obtaining for each data field a value representative of a storage requirement in memory and a field descriptor for that field;
    using the value and the field descriptor to load the packet into a target memory according to the target format specified by the field descriptor; and
    wherein the field descriptor denotes the nature of the data field as one of a used field and an unused field.

2. A method according to claim 1, wherein the field descriptor denotes the nature of a used field as one of a text field and an integer field.

3. A method according to claim 1, comprising the further steps of:
    using a source pointer to identify each data field in the received packet;
    determining whether the data field is used or unused;
    where the data field is used, using a target pointer to identify a location in memory based on the value representative of the storage requirement in memory of that field and storing the field in the identified location in memory;
    where the data field is unused, using a target pointer to identify a location in memory based on the value representative of the storage requirement in memory of that field and moving the target pointer to a new location in memory corresponding to the end of the storage requirement.

4. A method according to claim 1, comprising the further step of, before storing the tables for each type of packet, creating a table for each type of packet.

5. A method of converting a packet of data from a source format to a target format, the packet comprising a type indicator and at least one data field, the method comprising the steps of:
    storing a table for each packet type, each table comprising for each data field of that packet type a value representative of a storage requirement in memory and a corresponding field descriptor denoting the nature of the data field;
    receiving a packet in a source format;
    identifying the type of packet from the type indicator;
    accessing the stored table for the type of packet identified and thus obtaining for each data field a value representative of a storage requirement in memory and a field descriptor for that field;
    using the value and the field descriptor to load the packet into a target memory according to the target format specified by the field descriptor; and
    wherein each table comprises a plurality of rows, one or more of which rows corresponding to a field of the packet type associated with the table, each row having two bits allocated as the field descriptor.

6. A method according to claim 5, wherein each table comprises a further row having a value of zero for indicating the end of the packet.

7. A method according to claim 5, wherein if both of the two bits are zero, the row corresponds to a used field which is an integer field.

8. A method according to claim 5, wherein if a first of the two bits is zero and a second of the two bits is one, the row corresponds to a used field which is a text field.

9. A method according to claim 5, wherein if a first of the two bits is one and a second of the two bits is zero, the row corresponds to an unused field.

* * * * *